A. P. ANDERSON.
ART OF TREATING CEREAL GRAINS AND A PRODUCT THEREBY OBTAINED.
APPLICATION FILED APR. 24, 1907.
1,035,838.
Patented Aug. 20, 1912.
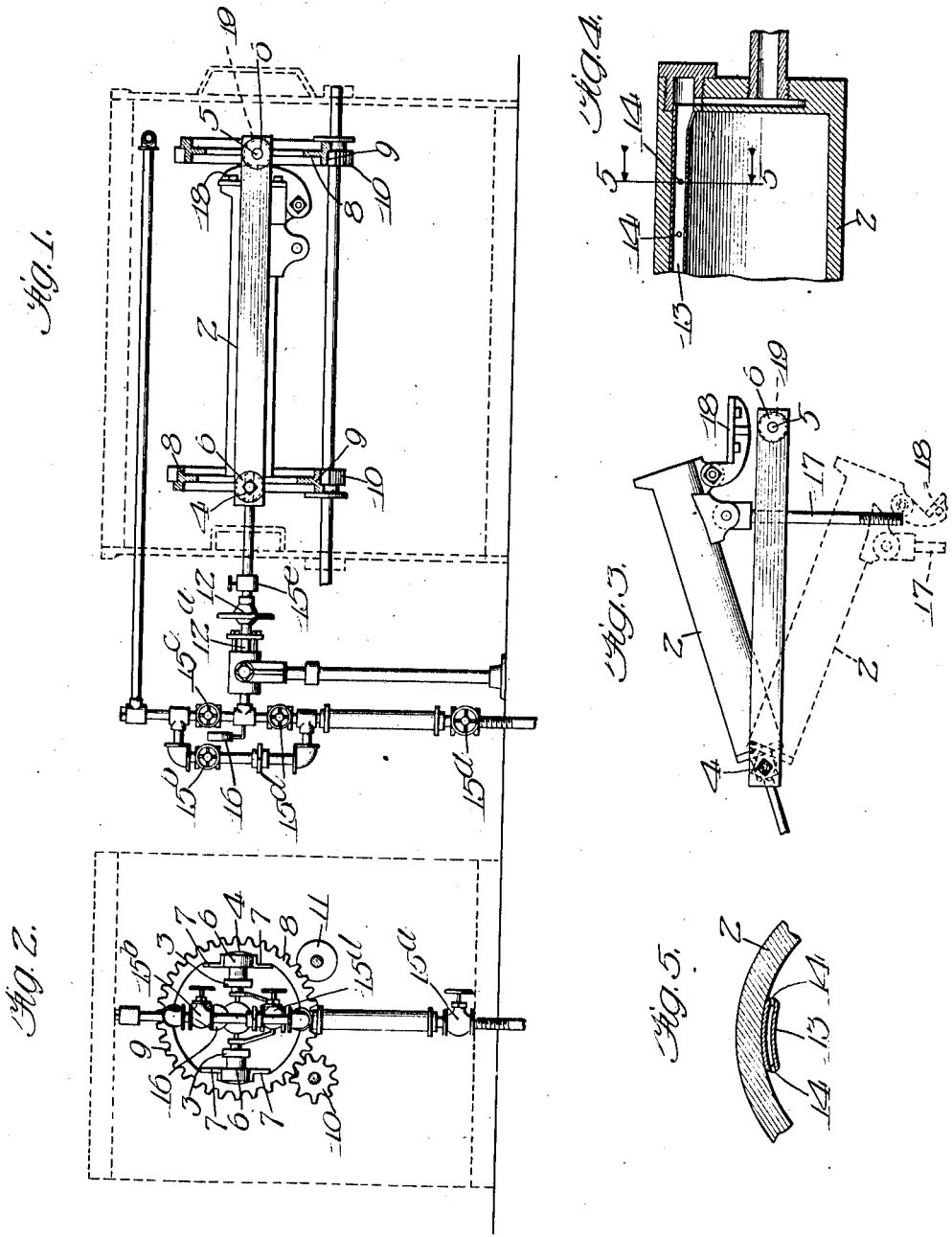
Witnesses:
Ira L. Perry
A. A. Thomas
Inventor:
Alexander P. Anderson
By Jones, Addington & Ames
Att'ys.

UNITED STATES PATENT OFFICE.

ALEXANDER P. ANDERSON, OF CHICAGO, ILLINOIS.

ART OF TREATING CEREAL GRAINS AND A PRODUCT THEREBY OBTAINED.

1,035,838.  Specification of Letters Patent.  Patented Aug. 20, 1912.

Application filed April 24, 1907. Serial No. 370,006.

*To all whom it may concern:*

Be it known that I, ALEXANDER P. ANDERSON, a citizen of the United States, residing at Chicago, in the county of Cook and State of Illinois, have invented new and useful Improvements in the Art of Treating Cereal Grains and a New Product Thereby Obtained, of which the following is a full, clear, concise, and exact description, reference being had to the accompanying drawing, forming a part of this specification.

This invention relates to an improvement in the art of treating cereal grains and to a new product thereby obtained.

The invention is highly advantageous to the treatment of any and all of the cereal grains, but is especially applicable to the treatment of rice, whether hulled or unhulled rice, which latter is usually known as "paddy rice."

In my United States Patent No. 707892 I have set forth a process of swelling starch materials, including the cereal grains. During the practice of the said process, I discovered that by a modification of the same I was enabled to provide the grains with a coating at an intermediate stage of the process; namely, prior to the final step of swelling the grains. By this means I obtained a novel product, as will be more fully explained hereinafter.

Broadly considered, the invention consists in creating upon the individual kernels an artificial coating which is resistant to the escape of steam or water vapor from the interior of the kernel. The most perfect method of producing such a coating on the grain obtains when the kernels are subjected to a treatment whereby there takes place within the grain a drying out or desiccation process and at the same time a condensation of moisture on the surface of the grain, this moisture being hot enough to cause gelatinization of the surface starch-layers.

In the accompanying drawings I show one form of apparatus suitable for treating cereal grains in accordance with the herein described process.

Figure 1 is a side view of the piping together with a longitudinal sectional elevation of the drum-support in the oven, the latter being indicated in dotted lines; Fig. 2 is a rear end view of the arrangement shown in Fig. 1; Fig. 3 shows the drum in charging and discharging positions, the latter being indicated in dotted lines; Fig. 4 is a sectional view of the rear end of the drum or cylinder; and, Fig. 5 is a section of the drum in the line 5—5 of Fig. 4.

The material to be treated is put into a drum 2, mounted upon a suitable car capable of being rolled about and brought to the various parts of the apparatus for handling. The car consists of two side members 3, 3, having a trunnion 4 extending therebetween at the rear end; a shaft or axle 5 connects the forward ends of said members. Small wheels or rollers 6 are mounted outside of the members 3, upon the projecting ends of trunnion 4 and shaft 5. The cars run on a track 7 within the oven consisting of four rails fastened to the inside of the cage 8. At each end of the oven is a ring 9 having teeth outside forming a gear, which meshes with another gear 10 adapted to rotate the cage. The gears 10 and rollers 11 support the cage and inclosed drum, in addition to causing rotation thereof by any suitable power applied to one of their supporting shafts outside of the oven. After the drum has been run into the oven, a steam-connection is made at 12, thus admitting steam to the flattened pipe 13 inside of the drum. The steam escapes into the drum through numerous holes 14 in the pipe, said holes becoming more frequent in proportion to the drop in pressure as the steam advances.

By means of gears 9 and 10 the cage containing the drum is rotated slowly during the heating. Rotation is permitted by the stuffing box 12$^a$ which at the same time maintains the steam connection. The arrangement of the piping shown is as follows; 15$^a$, 15$^b$, 15$^c$, 15$^d$ and 15$^e$ are valves; 16 is a pressure gage. By opening valves 15$^b$ and 15$^a$, and closing valves 15$^d$ and 15$^c$, the steam is by-passed around the drum. By closing valves 15$^b$ and 15$^d$ and opening 15$^c$, the pressure in the drum may be brought to any desired point, as shown by gage 16. To reduce the pressure in the drum, valve 15$^c$ may be closed, and 15$^d$ opened. Thus, by proper valve-manipulation the conditions of pressure and temperature in the drum may be regulated and controlled absolutely within the desired limits. It will be understood that the oven is heated by any suitable or desired means,—as, for example, by gas.

The lid 18 of the drum is clamped tightly closed, a suitable soft-metal gasket being provided to cause an air-tight connection, when the drum is in the horizontal position in the frame. In order that the heating may not unseal the lid, I prefer to make the drum of bronze, or some material having a higher coefficient of expansion than the side members of the frame.

To remove the drum from the oven after the heating, valve 15ᵉ is closed, the drum is disconnected at 12, and is run out of the oven to a raising and lowering mechanism suitably connected with the drum through the arm 17. By means of this mechanism the drum is lowered about the shaft 4 as a pivot, as indicated in dotted lines in Fig. 3. The lid 18, previously held shut by the roller 19, suddenly flies open from internal pressure, and the contents are discharged, assisted by gravity, and at the same time puff up in size. The puffed product is discharged with considerable force into a receptacle or cage many times the volume of the drum and adapted to confine it. In charging, the drum is raised by the same arm or screw 17 until it tilts upwardly, when the material to be treated may be fed into the drum.

For the purpose of making a full and complete description of my invention I shall describe in detail the preferred manner of carrying out the process, at the same time realizing that variations may be made therein without departing from the principle of the invention.

A sufficient quantity of the material to be treated,—as, for instance, rice in a substantially air-dry condition,—is poured into the drum or cylinder to fill the latter from one-third to two-thirds. The cylinder is now sealed air-tight, and is heated, while being rotated, to a temperature of about 150 to 300 degrees C. for a period of twenty minutes to two hours or more. The time of treatment, of course, depends upon the size of the cylinder, the temperature of the oven, and the kind of heat applied; it being evident that the higher the temperature, the shorter the time,—or vice versa.

Owing to the fact that rice grains when in a substantially air-dry condition contain a certain amount of moisutre, (say from ten to twenty per cent.) the first effect of the heating is to evaporate or drive off a portion of this moisture. The result is that the confined space in the cylinder soon becomes saturated with moisture in the form of steam or water vapor, and with increase of temperature a corresponding increase of pressure takes place within the cylinder. During this treatment the wall of the cylinder is at a higher temperature than that of the rice. By the rotation of the cylinder the rice is tumbled or agitated in such a way as to expose all portions of the surface of the grains to the action of the moist air and the heat. As the rice grains are cooler than the surrounding steam-atmosphere, the moisture of the latter continually condenses on the rice grains, giving them a surface layer of free water in the form of "sweat." It is evident from the conditions of the treatment that the free water on the surface of the rice grains has been drawn from the interior of the grains, and that therefore the interior of the grain is dryer than the peripheral portion, containing in fact a less percentage of moisture than the rice contained at the beginning of the treatment when in its air-dry condition. As soon as the temperature of the rice reaches 70 degrees C. this surface moisture or "sweat" begins to act on the exposed and peripheral starch layers, hydrating or gelatinizing them. With the increasing temperature and pressure of the confined rice and surrounding steam, this hydrating effect becomes more marked; so that when a pressure of from 10 to 100 pounds has developed, the free water or "sweat" has been taken up by the peripheral portions of the rice grains and formed there a continuous sealed, glassy and horn-like layer or coating completely surrounding the interior of the kernel. This interior, on account of its having been practically free from the action of the film of surface water, is retained essentially in its normal condition.

As soon as the desired pressure has developed within the cylinder, say from 10 to 100 pounds, (depending upon the temperature to which it is desired to heat the grain,—said temperature varying from 110 to 170 degrees C.,) all the pressure is reduced slowly, as by blowing off, the cylinder is then opened, and the rice taken out.

It is well known that the starch granules of rice develop during the growth of the grain in a limited or cramped space, causing in the ripened or matured grain a very solid and compact structure wherein the starch granules are so closely packed that they resemble the bricks in a brick wall, excepting that in the raw grain they are not cemented together like the bricks in a brick wall. When, however, the rice grains are treated as above described, so as to draw the moisture of the grain from its interior and condense it on the surface, the starch granules of the periphery become more or less hydrated; at the same time, swelling slightly, they press upon each other to such an extent that there results a coalescence of their contact planes. Thus, a continuous horny, glassy and impervious surface coating is formed, covering the interior of the grain.

The above steps in the carrying out of the process may be slightly varied. For instance: when the desired pressure has been reached, it may be increased suddenly by injecting dry steam at a higher pressure than that of the cylinder. Steam preferably slightly superheated is used for this purpose. Now, after allowing the steam to condense on the surface of the grains for a short time, the whole pressure is slowly reduced, as by being blown out, as above explained, and the cylinder is opened and emptied of its rice. The steam thus injected thickens the coating already present on the grain, and has been found to aid in its formation, especially when the rice under treatment contains a low percentage of moisture, or when some of the moisture of the grain has leaked out of the cylinder during the treatment on account of imperfect sealing.

Unhulled rice, known as paddy rice, may be treated in the same manner as hulled rice. During the treatment there will take place a desiccation of the interior of the grain with a peripheral condensation of the moisture from the hotter surrounding steam-atmosphere, such condensation making the rice grain of the paddy resistant in the manner similar to that of hulled rice above explained. The surface condensation takes place also on the hull of the paddy which tends to soften and loosen the hull from the grain, making it come off more easily in the final swelling or puffing by methods given below. Also, when hulled by the usual methods of hulling rice by machinery, paddy treated by my method hulls much more easily and with less breaking up of the grain than when hulled in its raw, untreated condition.

The new product which also forms a part of the subject matter of this application comprises, broadly considered, a substantially unexpanded cereal grain having an artificial outer layer resistant to the escape of moisture from the interior of the grain, since now the moisture cannot escape by passing between the granules of starch but must pass or diffuse through them, which process requires more time. The interior of the grain is retained in its normal condition—that is to say, it is not essentially resistant to the passage of steam or water vapor.

When the resistant grains of rice are cut in halves and the cut surfaces examined with a lens, they show a coating clearly in the form of a glassy, horny peripheral ring. The thickness of this ring varies with the extent of the treatment and with the amount of moisture the grains contained during the treatment. The horny periphery rarely extends to the center of the grain; although if it is desired to change the entire grain to this horny condition, this can be done by continuing the treatment in the steam-atmosphere, as above explained. Another characteristic of my new rice product is that it can be puffed immediately after the above treatment, or at any desired time thereafter. To do this the resistant rice grains are subjected to a treatment whereby an internal pressure is produced in the grains. This treatment consists broadly in heating the grain at a temperature varying from about 175 to 400 degrees C., for a period of about five seconds to one hour or more, according to the method of supplying the heat. In this way the moisture contained in the kernels is rapidly converted into steam. As the latter cannot escape with sufficient rapidity through the resistant periphery of the grain, a pressure is generated in the interior of the kernel whereby the latter is swelled or expanded. Furthermore, as the periphery of the kernel is of such a nature as to be plastic in its heated condition, the peripheral coating or ring stretches under the influence of the internal pressure, becoming inflated and cellular with the steam. This enables the grain, although swelling, to retain its original shape,—that is to say, the shape of the swelled grain is substantially homologous to that of the natural grain.

Such puffing as here explained can be effected in various ways; thus, the rice may be again treated and puffed as described in my application Serial Number 370,004, filed April 24, 1907; or, it may be puffed by creating a pressure inside of the kernels by immersing them in fat or oil kept at a temperature of from 200 to 260 degrees C. If the kernels have been made sufficiently resistant and are in the right hygroscopic condition, (that is, substantially air-dry), they swell evenly, enlarging several times in volume in five to ten seconds. Another simple method of testing and puffing the new rice product is to place it in a suitable receptacle, preferably perforated or reticulated—as for example, an ordinary corn-popper. This is then introduced into any suitably heated chamber, (as the oven of a cook-stove) said chamber being at a temperature of about 225 to 400 degrees C. The material is agitated during the heating, as by shaking the popper, so that the grain receives its heat substantially uniformly, whereby it will puff up and enlarge several times in volume by becoming cellular and inflated with steam. On cooling the grain remains in this enlarged or puffed condition. It is now ready as a food without any further treatment.

Having thus described my invention, what I claim as new and desire to secure by Letters Patent of the United States, is:

1. The process disclosed which consists in confining substantially air-dry grain in an air-tight receptacle and heating the interior of the receptacle to a sufficient degree to drive out the moisture in the grain and convert the same into steam, meanwhile agitating the grain, and, the temperature within the receptacle being higher than that of the grain, allowing the steam generated from the moisture of the grain to condense on the surface thereof, the heating being continued to allow the moisture on the grain in the presence of the heat to gelatinize the peripheral starch layers of the individual grains so as to form thereon a horny gelatinized outer layer.

2. The process disclosed which consists in confining substantially air-dry grain in an air-tight receptacle and heating the interior of the receptacle to a sufficient degree to convert into steam the moisture in the grain, the heating and agitating being continued until the steam generated from the moisture of the grain condenses on the surface of the grain, and, due to the presence of the gelatinizing temperature within the receptacle, acts on the surface of the individual grains so as to form thereon a horny gelatinized outer layer.

3. The process disclosed which consists in subjecting substantially air-dry grain in an air-tight receptacle, and while the grain is being agitated, to sufficient heat to drive out moisture from the grain and convert the same into steam under pressure within the receptacle, the heating and agitating being continued until the steam condenses on the surface of the grain and with the heat within the receptacle acts on the surface of the individual grain so as to form thereon a horny gelatinized outer layer, then injecting steam into the receptacle whereby said outer layer is thickened, and then reducing the pressure within the receptacle.

4. The process disclosed which consists in subjecting substantially air-dry rice in an air-tight receptacle, and while the rice is being tumbled, to sufficient heat to drive out moisture from the rice and convert the same into steam under pressure, without raising the temperature of the rice to that of the receptacle, the heating and tumbling being continued until the steam generated from the moisture of the rice condenses on the surface of the individual grains and, in the presence of the heat within the receptacle, acts on the surface of the individual grains so as to form thereon a horny gelatinized outer layer, then injecting superheated steam into the receptacle whereby the said outer layer is thickened, and then reducing the pressure within the receptacle.

5. As a new article of manufacture, cereal grains of substantially natural size, having an artificial gelatinized dry outer layer resistant to the escape of fluid under pressure from the interior of the grain.

6. As a new article of manufacture, rice grains of substantially natural size, having a gelatinized dry artificial outer layer resistant to the escape of fluid under pressure from the interior of the grain.

7. As a new article of manufacture, grains of paddy rice of substantially natural size, having a gelatinized horny artificial layer resistant to the escape of fluid under pressure from the interior of the grain.

In witness whereof, I have hereunto subscribed my name in the presence of two witnesses.

ALEXANDER P. ANDERSON.

Witnesses:
  A. A. Thomas,
  C. L. Hopkins.